Aug. 25, 1936.　　P. KOLLSMAN　　2,052,409
INDICATOR
Filed June 18, 1934
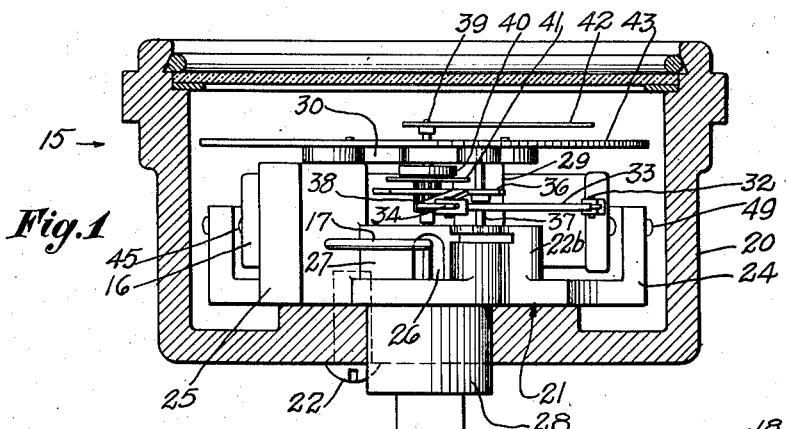
Fig. 1
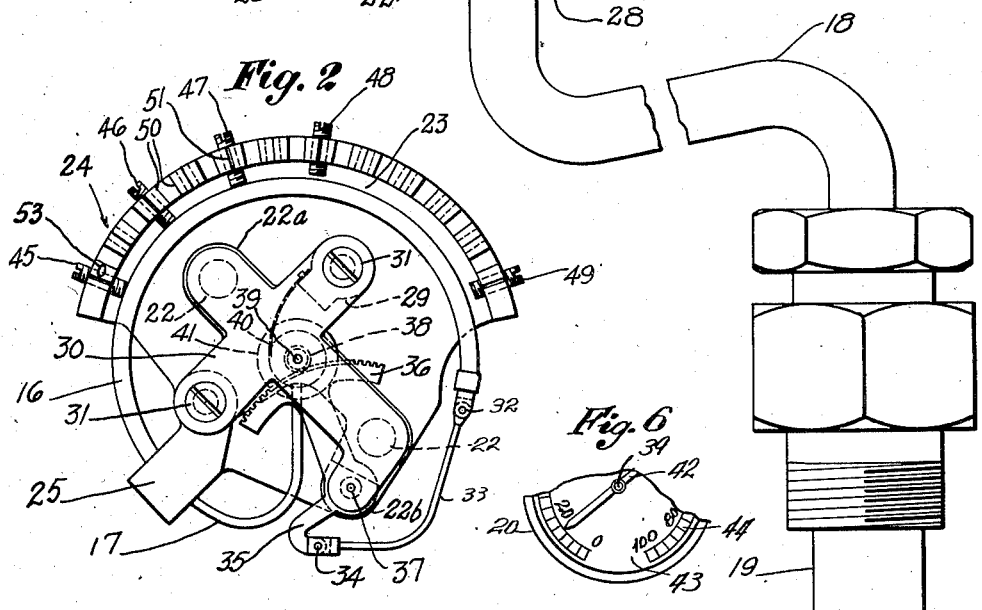
Fig. 2
Fig. 6
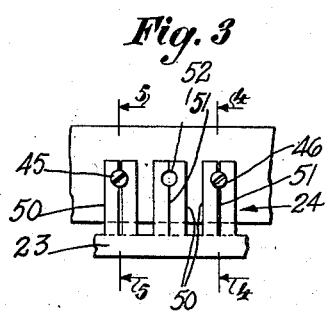
Fig. 3
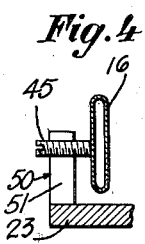
Fig. 4
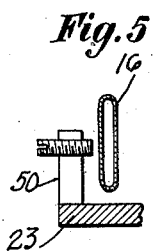
Fig. 5
INVENTOR:
Paul Kollsman
BY
ATTORNEY Patented Aug. 25, 1936

2,052,409

UNITED STATES PATENT OFFICE 2,052,409

INDICATOR

Paul Kollsman, New York, N. Y.

Application June 18, 1934, Serial No. 731,063

4 Claims. (Cl. 73—109)

This invention relates to indicators.

One object of the invention is to provide a device of the character described having improved means for the setting or calibration of an indicator, with particular reference to one provided with a deformable element whose shape has the capacity of affecting the readings of the instrument.

Another object of the invention is the provision of an instrument for measurement of temperature by the utilization of an expansible fluid in a Bourdon tube, or the like, together with improved means whereby readings caused by the Bourdon tube can be taken on a scale having equal scale divisions throughout.

Another object of the invention is to provide improved means for controlling maximum deformations of different sections of a resilient actuator element so that the resulting readings shall follow a prescribed curve.

Another object of the invention is the provision of an improved device of the nature set forth, having relatively few and simple parts, and which is inexpensive to manufacture and assemble, compact, light in weight, convenient and adapted for highly accurate setting, durable, reliable and efficient in use.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated in the annexed drawing, wherein like parts are designated by the same reference characters throughout the several views.

In the drawing:

Figure 1 is a fragmentary device in vertical section showing an embodiment of the invention.

Fig. 2 is a top plan view of the indicator per se with parts removed.

Fig. 3 is a fragmentary view in elevation of a portion thereof.

Figs. 4 and 5 are vertical sectional views taken respectively on lines 4—4 and 5—5 of Fig. 3.

Fig. 6 is a fragmentary top plan view of a Bourdon indicator showing the scale.

Generally described, this invention relates to the setting or calibration of instruments having deformable elements for influencing or causing the instrument readings. The invention contemplates means for affecting the deflection of the deformable element, and such means can be arranged to be operative either continuously, or intermittently, as for instance, successively, and in either all positions or in only one position of deformation of the element. Further, the means may be either stationary or movable relative to the element, and may be either rigid or deformable with respect thereto. With the foregoing observations, it will be understood that the means referred to may be embodied in the operating mechanism actuated by the element, or may act directly or indirectly on the element itself. The said element may be any device movable to and fro responsive to variable forces such as pressure changes, and while, for certain purposes of the invention, it may be merely pliable, yet the most desirable arrangement is to utilize an element that is semirigid, and the best results are obtained by using an elastic or resilient element. The means for affecting the element may include portions acting at spaced points along the element so that adjustment can be rapidly made at one or more of such points, the element being subject in certain cases to an average of such adjustments, although it is also possible to provide that an adjustment at one point shall affect one section of the element without materially influencing other sections thereof. The adjusting portions may be in the nature of projections pressed out as by screw means, but the best construction requires the use of portions that are movable back and forth so that an excessive adjustment can be corrected. In the sense that the adjustment or setting is made without producing a permanent deformation in the element structure, the adjusting means may be said to be external of the element. From a similar point of view, it is noted that the control of the deformation or shape of the element may be exercised within the elastic limit thereof.

The advantages of the invention as here outlined are best realized when all of its features and instrumentalities are combined in one and the same structure, but, useful devices may be produced embodying less than the whole.

It will be obvious to those skilled in the art to which the invention appertains, that the same may be incorporated in several different constructions. The accompanying drawing, therefore, is submitted merely as showing the preferred exemplification of the invention.

Referring in detail to the drawing, 15 denotes a device embodying the invention. The same may be in the nature of an instrument for showing temperature-pressure changes or relationships as by indicating pressure variations. The pressure variations may act directly in a suitable element or may indirectly affect the same as by fluid pressure. For instance, the device 15 may include a Bourdon tube 16 connected by a small tube 17 with a flexible conduit 18 leading to a container 19 for a suitably vaporizable liquid, according to the well known principle.

To illustrate a conventional instrument indicator that may be employed, I show a housing 20 in which is secured a frame 21 as by screws 22 threaded into bosses 22a and 22b of the frame. This frame includes a base plate 23 that may have an arcuate upstanding flange 24 for a purpose hereinafter described. Integral with the plate is an upright hollow section 25 to one side of which is connected an end of the Bourdon tube 16, the tube 17 being connected in communication therewith at an opposite side of 25 and extending through an opening 26 in a central block 27 of the frame, and thence into communication with the conduit 18 within the sleeve portion 28 of the frame. The latter may also have an integral standard 29, a plate 30 resting on the frame portions 25 and 29 and being secured thereto by screws 31. Pivotally connected at 32 to the free end of the Bourdon tube 16 is a link 33 that is pivotally connected at 34 to the arm 35 of a gear segment 36. The latter is mounted on a spindle 37 journaled in plate 30 and the boss 22b, and actuates a pinion 38 mounted on a stem 39 journaled in plate 30 and boss 27. A hair spring 40 supported by a plate 41 fixed on the spindle 39 is mounted to function in the usual manner. A pointer 42 is mounted on the spindle 39 so as to move over a dial 43 fixed to the plate 30.

Heretofore, the dials for gages operating according to the Bourdon principle have always been provided with scales having subdivisions which increased in size with increase in the gage readings. According to my invention, the dial 43 is provided with a scale 44 having equal subdivisions throughout, and the pointer 42, of course, having equal movements for equal temperature changes along the scale. This desirable result was heretofore impossible of attainment because the generation of pressure increases out of proportion to an increase of temperature. Moreover, while certain adjustments for the instrument can be made by bending the link 33, yet it was frequently found necessary to bend the Bourdon tube itself to obtain an approximately accurate curve for the instrument. This is eliminated by the invention that will now be described.

The invention includes a setting or adjusting means of which the flange 24 is a member, and which may have one or more portions spaced along and projecting radially toward the Bourdon tube 16. Desirably these portions are adapted for delicate and sensitive actuation, and are retractible as well as projectable. Hence I may use one or more set screws 45 to 49 threaded through the flange 24, and so as to be easily accessible. In order to assure against a change in setting of the screws due to vibration, the flange is constructed so as to consist of a series of upstanding parallel spaced fingers 50 each of which is longitudinally split at 51 through the screw hole 52 so as to cause the set screw to be resiliently securely gripped.

It will be noted that with the gage indicating a temperature of approximately 15 in Fig. 6, the first two screws 45, 46 are in abutment with the side of the Bourdon tube. The third set screw 47 is slightly out of contact with the tube, the set screws 48 and 49 are successively further away therefrom. A set screw is omitted between each of the first four set screws, and several set screws are omitted between the set screws 48, 49, as unnecessary. It is understood that the set screws are used in such positions and with such frequency as may be required.

The method of calibration will now be described. The instrument is first adjusted as accurately as possible, by bending the link 33 to obtain the correct leverage of the Bourdon tube element 16 on the mechanism for actuating the indicator 42. This adjustment may be made with the container 19 maintained at zero degrees, the pointer 42 being then set at zero or slightly above, the latter being more quickly accomplished. Then the set screw 45 is screwed to bear against the element 16 to cause the pointer to move counterclockwise to register zero accurately. A very slight turn of the screw, as through an angle of 30 degrees may suffice. This constitutes the operation of zero setting the instrument, and the screw 45 may be denominated the zero setting member. The setting may also be accomplished by causing the screw 45 to initially contact the element 16, after which the screw 45 may be turned in one or an opposite direction, according to the desired setting movement of the pointer.

The calibration of the instrument as distinguished from the zero setting thereof is now accomplished. The container 19 is maintained at successive known temperatures and the screws applied wherever necessary, and adjusted successively to obtain accurate scale readings. The particular screw to be adjusted for a given scale reading has an approximately similar position to the reading on the scale, but generally speaking, the screw to be adjusted for the particular reading is determined by trial. For example, for a scale reading in the region of 20, the screw 46 is adjusted, and screws 47, 48 may apply to scale readings in the vicinity of 40 and 60 respectively, while the screw 49 may govern all that section of the element 16 which functions as the primary control for scale readings from approximately 80 to 100. In setting each screw, the pointer is caused to move counterclockwise. Since all the screws are radial, a fine and delicate setting can be accomplished. If desired, one of the elements 16 or 24 may have markings such as at 53 corresponding to the main scale readings or subdivisions so as to directly indicate the location of a screw for a particular adjustment. In any case, it will be seen that the setting of the screws is successively accomplished beginning near the fixed end of the elastic element 16, and that each adjustment may be independently effected, and that if there is an over adjustment of a screw, the latter can be retracted. The semirigid or resilient character of the element 16 causes the same to follow a uniform performance curve at those points where the element is not supported.

The operation of the device 15 will now be briefly described. If the instrument reading be zero, the Bourdon tube 16 is in contact only with the zero setting screw 45 and out of contact with the remaining screws, the gaps between the latter and the Bourdon tube increasing successively and relatively regularly. As the temperature at container 19 increases, the Bourdon tube in its normal operation successively engages the successive stop screws which thus define the actual performance curve of the instrument. Since it is sufficient that the contact pressure between the screws and the Bourdon tube shall be extremely slight, it results that accuracy and operation free of lag is maintained.

It will be appreciated that various changes and modifications may be made in the device as shown in the drawing, and that the same is submitted in an illustrative and not in a limiting sense, the scope of the invention being defined in the following claims.

I claim:

1. In a temperature gage for continuously measuring temperatures according to fluid pressures up to a certain maximum pressure to which the gage can be subjected without distortion or breakage, the combination with a movable indicator and a temperature scale therefor, of a Bourdon tube for actuating the indicator, and means for limiting the deflection of said tube under pressure, said scale extending along the entire path of movement described by the indicator in response to pressures substantially up to said maximum pressure on the Bourdon tube, said scale having subdivisions of equal size throughout, and said means including a series of individually adjustable elements disposed along the Bourdon tube and adapted to individually successively abut the same upon expansion of the Bourdon tube, to cause the Bourdon tube, which would otherwise require unequal scale divisions, to actuate said indicator in accordance with said equal scale divisions for correct temperature indication.

2. In a temperature gage for continuously measuring temperatures according to fluid pressures up to a certain maximum pressure to which the gage can be subjected without distortion or breakage, the combination with a movable indicator and a temperature scale therefor, of a Bourdon tube for actuating the indicator, and means for limiting the deflection of said tube under pressure, said scale extending along the entire path of movement described by the indicator in response to pressures substantially up to said maximum pressure on the Bourdon tube, said scale having subdivisions of equal size throughout, and said means including a series of individually adjustable elements disposed along the Bourdon tube and adapted to individually successively abut the same upon expansion of the Bourdon tube, said elements being more closely spaced with respect to each other in the region intermediate of the ends of the Bourdon tube than in the region at the free end of the Bourdon tube, as set forth.

3. In a temperature gage for continuously measuring temperatures according to fluid pressures up to a certain maximum pressure to which the gage can be subjected without distortion or breakage, the combination with a movable indicator and a temperature scale therefor, of a Bourdon tube for actuating the indicator, and means for limiting the deflection of said tube under pressure, said scale extending along the entire path of movement described by the indicator in response to pressure substantially up to said maximum pressure on the Bourdon tube, said scale having subdivisions of equal size throughout, said Bourdon tube being relatively long and extending along an arc greater than 180 degrees, and said means including a series of elements, said series being disposed along the Bourdon tube and said elements being individually adjustable toward and away from the Bourdon tube for setting, said elements being spaced at successively increasing distances from the Bourdon tube toward the free end thereof for successive engagement with the Bourdon tube, and all of said elements having direct contact with the Bourdon tube upon full expansion thereof, and causing the Bourdon tube to positively assume a shape corresponding to the setting of said elements to actuate said indicator according to said scale.

4. In a temperature gage for continuously measuring temperatures according to fluid pressures up to a certain maximum pressure to which the gage can be subjected without distortion or breakage, the combination with a movable indicator and a temperature scale therefor, of a Bourdon tube for actuating the indicator, and means for limiting the deflection of said tube under pressure, said scale extending along the entire path of movement described by the indicator in response to pressure substantially up to said maximum pressure on the Bourdon tube, said scale having subdivisions of equal size throughout, said Bourdon tube being elongated along an arc of substantial radius and angle for sensitive actuation of the indicator, and said means including a plurality of elements located intermediate of the ends of the Bourdon tube and spaced therealong, and another element located adjacent to the free end of the Bourdon tube, said elements being individually adjustable and having direct engagement with the Bourdon tube for directly and differently constraining the expansion thereof at different points therealong in response to increasing pressures to cause said indicator to move in accordance with said equal scale divisions throughout the scale for accurate temperature indication.

PAUL KOLLSMAN.